United States Patent [19]

Pittet et al.

[11] 3,959,508
[45] May 25, 1976

[54] FLAVORING COMPOSITIONS CONTAINING MIXTURE OF 2,2,6-TRIMETHYL-1-CYCLOHEXEN-1-YLACETALDEHYDE AND 2,6,6-TRIMETHYL-1-CROTONYL-1,3-CYCLOHEXADIENE

[75] Inventors: Alan Owen Pittet, Atlantic Highlands; Erich Manfred Klaiber, Neptune; Manfred Hugo Vock, Locust, all of N.J.; Edward J. Shuster, Brooklyn, N.Y.; Joaquin Vinals, Red Bank, N.J.

[73] Assignee: International Flavors & Fragrances Inc., New York, N.Y.

[22] Filed: July 24, 1975

[21] Appl. No.: 598,654

Related U.S. Application Data

[63] Continuation-in-part of Ser. No. 507,412, Sept. 19, 1974.

[52] U.S. Cl................................ 426/534; 426/535; 426/538; 252/522; 131/17 R
[51] Int. Cl.².......................................... A23L 1/226
[58] Field of Search .............. 426/538, 3, 534, 535; 252/522; 131/17 R, 144

[56] References Cited
UNITED STATES PATENTS 3,872,031  3/1975  Moolsherjie et al................ 252/522
3,899,597  8/1975  Moolsherjie et al................ 426/538

*Primary Examiner*—Joseph M. Golian
*Attorney, Agent, or Firm*—Arthur L. Liberman; Harold Haidt; Franklin D. Wolffe

[57] ABSTRACT

Processes and compositions are described for the use in foodstuff flavor and aroma, tobacco flavor and aroma and perfume aroma augmenting, modifying, altering and enhancing compositions and as foodstuff, chewing gum, toothpaste, medicinal products, tobacco, perfume and perfumed article aroma imparting materials of mixtures of (i) 2,2,6-trimethyl-1-cyclohexen-1-ylacetaldehyde (hereinafter referred to as "beta-cyclohomocitral") and (ii) 2,6,6-trimethylcrotonyl-1,3-cyclohexadiene having the structure:

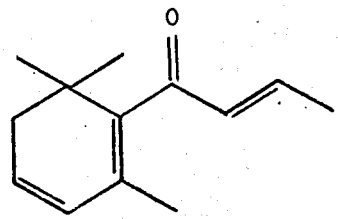

hereinafter referred to as "damascenone". Addition of mixtures beta-cyclohomocitral and damascenone is indicated to produce:
a. In food flavorings, a fruity, rosey, woody, tea aroma and a woody-tea, fruity-tobacco flavor;
b. In tobacco, a sweet, floral, fruity, earthy, green aroma prior to smoking and a sweet, rich, tobacco-like smoke aroma augmenting effect with woody flavoring characteristics in the mainstream on smoking; and
c. In perfumes, rosey, woody, camphoraceous, green and earthy notes.

6 Claims, No Drawings

FLAVORING COMPOSITIONS CONTAINING MIXTURE OF 2,2,6-TRIMETHYL-1-CYCLOHEXEN-1-YLACETALDEHYDE AND 2,6,6-TRIMETHYL-1-CROTONYL-1,3-CYCLOHEXADIENE

This application is a Continuation-in-Part of U.S. application for Letters Patent Ser. No. 507,412 filed on Sept. 19, 1974.

BACKGROUND OF THE INVENTION

The present invention relates to mixtures of 2,2,6-trimethylcrotonyl-1,3-cyclohexadiene (or "damascenone") and 2,2,6-trimethyl-1-cyclohexen-1-ylacetaldehyde (or "beta-cyclohomocitral") produced by, inter-alia, a novel process described and claimed in copending U.S. application Ser. No. 507,414 filed on Sept. 19, 1974 and copending application for Ser. No. 594,100 filed on July 8, 1975 and novel compositions using such mixture of damascenone and beta-cyclohomocitral to alter, modify, enhance or impart the flavor and/or aroma of (or to) consumable materials.

There has been considerable work performed relating to substances which can be used to impart (or alter, modify or enhance) flavors and fragrances to (or in) various consumable materials. These substances are used to diminish the use of natural materials, some of which may be in short supply and to provide more uniform properties in the finished product. Fruity, rosey, woody and tea aromas as well as woody-tea and fruity-tobacco tastes are particularly desirable for many uses in foodstuff flavors. Woody, rosey, camphoraceous, green and earthy notes are desirable in several types of perfume compositions. Sweet, rich-tobacco, floral, fruity, green, woody, and earthy notes are desirable in tobacco flavoring compositions.

Arctander, "Perfume and Flavor Chemicals", 1969, discloses the use in perfume compositions and flavors of "cyclocitral", "dehydro-beta-cyclocitral", "iso-cyclocitral", "alpha-cyclocitrylidene acetaldehyde" and beta-cyclotrylidene acetaldehyde", thus:

i. "760: CYCLOCITRAL
Alpha-cyclocitral = (2,2,6-trimethyl-5-cyclohexen-1-carboxaldehyde).
Beta-cyclocitral = (2,2,6-trimethyl-6-cyclohexen-1-carboxaldehyde).
Both isomers are known and have been produced separately.

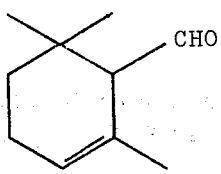 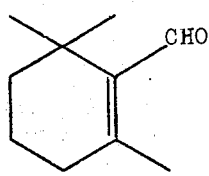

Very rarely offered commercially. These particular cyclocitrals have little or no interest to the creative perfumer, but they have served as part of many pieces of proof that isomers (alpha-beta) do often have different odors."

ii. "761: iso-CYCLOCITRAL
A mixture of two chemicals:
3,5,6-trimethyl-3-cyclohexen-1-carboxaldehyde (meta-cyclocitral).

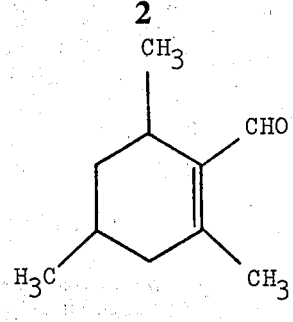

2,4,6-trimethyl-4-cyclohexen-1-carboxaldehyde (symmetric-iso-cyclocitral).

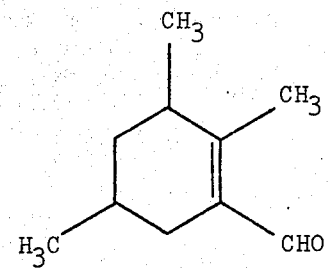

Powerful, and diffusive, foliage-green, "dark" weedy and dry odor, sometimes described as "Flower-shop odor". The earthy and wet-green notes are quite natural in high dilution and resemble the odor of stems from plants and flowers fresh from the soil.

Finds use in perfume compositions where it blends excellently with Oakmoss products (compensates for sweetness and lifts the topnote), with Ionones (freshness), Geranium and Galbanum (enhances the green and "vegetable" notes), etc. . . . ."

iii. "762: alpha CYCLOCITRYLIDENE ACETALDEHYDE

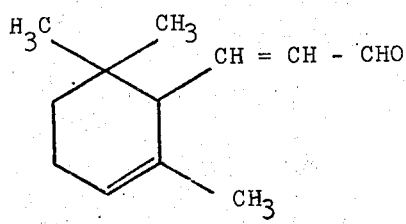

Mild, floral-woody, somewhat oily-herbaceous odor, remotely reminiscent of Rose with similarity to the odor of hydrogenated Ionones.

Suggested for use in perfume compositions. It brings a certain amount of floral lift to Rose compositions, and performs fairly well even in soap. However, the cost of the rarely offered and never readily available lots are rather discouraging to the perfumer, and it is most conceivable that this material can be left out of the perfumer's library without any great loss. . . . ."

iv. "763: beta-CYCLOCITRYLIDENE ACETALDEHYDE
2,6,6-trimethyl-1-cyclohexenyl-beta-acrolein.

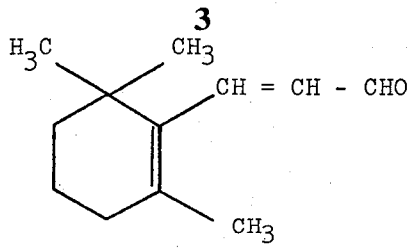

Sweet-woody, rather heavy odor, resembling that of beta-Ionone. More fruity than really floral, but not as tenacious as the Ionone.

Suggested for use in perfume compositions, but since it does not offer any new or unusual odor characteristics, and it cannot be produced in economical competition to beta-Ionone, there is little or no chance that it will ever become a standard shelf ingredient for the perfumer. . . ."

v. "869: DEHYDRO-beta-CYCLOCITRAL (Safranal) 2,6,6-trimethyl-4,4-cyclohexadiene-1-carboxaldehyde

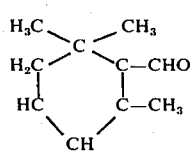

Very powerful, sweet, green-floral and somewhat tobacco-herbaceous odor of good tenacity. In extreme dilution reminiscent of the odor of Safran (Saffron).

Interesting material for fresh topnotes, as a modifier for aldehydic-citrusy notes, as a green-floral topnote in flower fragrances, etc. It blends excellently with the aliphatic Aldehydes, with Oakmoss products and herbaceous oils. . . ."

Safranal and beta-cyclocitral are disclosed as volatile constituents of Greek Tobacco by Kimland et al., Phytochemistry 11 (309) 1972. Beta-cyclocitral is disclosed as a component of Burley Tobacco flavor by Demole and Berthet, Helv. Chim. Acta. 55 Fasc-6, 1866 (1972).

THE INVENTION

It has now been discovered that novel solid and liquid foodstuff, chewing gum, medicinal product, and flavoring composition having rosey, fruity, woody and tea aromas and woody-tea and fruity-tobacco tastes, novel perfume compositions having rosey, woody, camphoraceous, green, earthy notes; as well as novel tobacco flavoring compositions having sweet, rich-tobacco, floral, fruity, green, woody and earthy notes may be provided by the utilization of mixtures of Damascenone which is a compound having the structure:

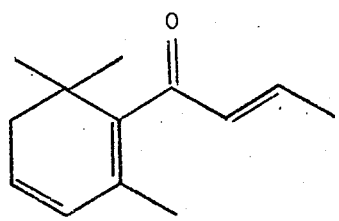

(Its organoleptic properties are set forth in Swiss Patent 520,479 issued on May 12, 1972) and beta-cyclohomocitral having the formula:

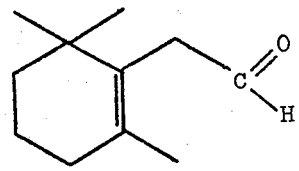

in foodstuffs, perfume compositions, perfumed articles, colognes and tobaccos as well as tobacco substitutes.

It has also been discovered by us that the organoleptic effect obtained when using the combination of Damascenone and beta-cyclohomocitral is more than merely additive of the individual organoleptic properties and strength of each of Damascenone and beta-cyclohomocitral; that the effect can be described as "synergistic".

One of the ingredients of the mixture of our invention, the beta-cyclohomocitral, may be produced, preferably, by processes which comprises either (A) a reaction carried out in two steps, the first of which is an oxidation reaction of beta-ionone with either performic acid, peracetic acid or perpropionic acid to form beta-ionone enol ester and, secondly, hydrolyzing the beta-ionone enol ester in the presence of base (either aqueous or alcoholic) to form the desired beta-cyclohomocitral or (B) forming beta-cyclohomocitral by oxidizing beta-ionone with hydrogen peroxide in the presence of inorganic base.

More specifically, the process (A) comprises the steps of:

i. Reacting beta-ionone having the formula:

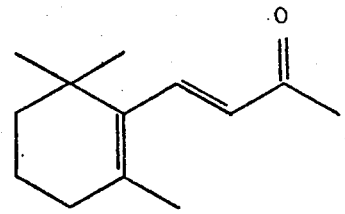

in the absence of dimethyl formamide with a peralkanoic acid having the formula:

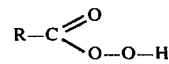

(wherein R is hydrogen, methyl or ethyl) to form beta-ionone enol ester having the formula:

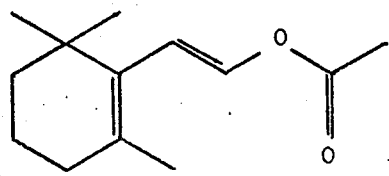

and not the expected beta-ionone epoxide having one of the formulae:

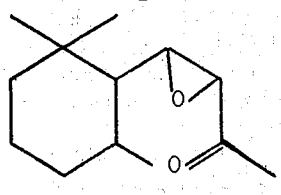

and/or

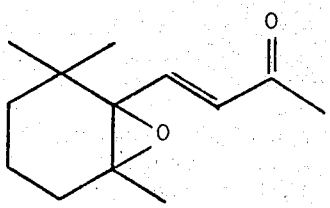

ii. hydrolyzing the beta-ionone enol ester in the presence of base (aqueous or alcoholic) to form beta-cyclohomocitral.

Insofar as the oxidation reaction is concerned:

A. where peralkanoic acids are used as the oxidizing agents, the reaction is preferably carried out in the presence of a buffer such as an alkali metal salt of a lower alkanoic acid or an alkali metal carbonate with a lower alkanoic acid such as propionic acid, acetic acid or formic acid with the following provisos:

i. The reaction is preferably carried out at temperatures of from 15°C up to about 75°C. Lower temperatures result in slower and less complete reaction and higher temperatures than 75°C result in lower yields of the desired product and significantly higher percentages of by-products. The most preferred temperature of reaction is 25°C.
  ii. A slight molar excess (from 10 up to 15 percent) of peracetic acid gives a slightly higher yield of product. A large excess (about 200 percent), however, results in the formation of dihydroactinodiolide having the structure:

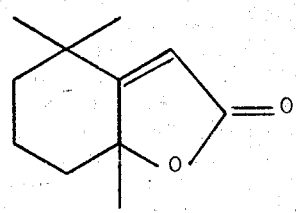

in about 30–35 percent yield when no buffer (e.g., potassium acetate) is present in the reaction mass;
  iii. Where potassium carbonate is substituted for potassium acetate as a buffer, the yield of product obtained is substantially the same;
  iv. On the other hand, a slightly lower yield of product is obtained by substituting sodium acetate for potassium acetate as the buffer;
  v. Substitution of formic acid for acetic acid in the reaction mass gives rise to a lower yield of product.
  vi. Any solvent inert to the action of peralkanoic acids may be used in this first oxidation reaction using alkanoic acids. For instance, the use of cyclohexane or chloroform as a solvent does not have an appreciable effect on the yield of product;
  vii. Omission of the buffer (i.e., thus performing the reaction under strongly acidic conditions) results in an incomplete reaction, lower yield and greater quantity of byproduct(s);
  viii. The use of dimethyl formamide as solvent results in the exclusive formation of beta-ionone epoxide having the structure:

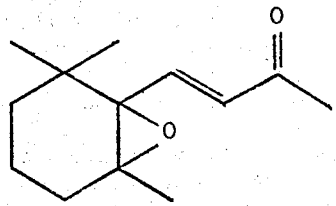

in about 70–75% yield and, accordingly, the presence of dimethyl formamide must be avoided;
  ix. The use of monoperphthalic acid (formed in situ from phthalic anhydride and hydrogen peroxide) yields beta-ionone epoxide in 60–70 percent yield. The use of perbenzoic acid in place of a paralkanoic acid has also been used to make beta-ionone epoxide R. Yves, et al., Helv. Chim. Acta, 29, 880 (1946).

It may be concluded that a peralkanoic acid such as peracetic acid in slight excess in the presence of a buffer system, preferably composed of acetic acid/potassium acetate is the preferred way to oxidize beta-ionone at 25°C to the corresponding enol acetate.

The beta-ionone enol ester preferably is hydrolyzed by 10 percent alkali metal hydroxide (e.g., potassium hydroxide, lithium hydroxide or sodium hydroxide) in admixture with 50 percent aqueous methanol, although other mild hydrolysis conditions (such as aqueous potassium carbonate, sodium carbonate or lithium carbonate solution) may also be used. As a result of the hydrolysis, beta-cyclohomocitral is formed.

The resultant reaction product, beta-cyclohomocitral may then be refined according to standard techniques, e.g., preparative gas chromatography, extraction, distillation and the like as further exemplified herein.

B. Where hydrogen peroxide (in the presence of inorganic base) is used as the oxidizing agent, the beta-cyclohomocitral is formed in one step from beta-ionone. The strength of hydrogen peroxide used is from about 10 percent up to about 50 percent. The inorganic base used may be an alkali metal hydroxide or alkali metal carbonate such as sodium carbonate, potassium carbonate, lithium carbonate, sodium hydroxide, potassium hydroxide or lithium hydroxide; preferably sodium hydroxide. The mole ratio of hydrogen peroxide:beta-ionone is preferably from about 1.1:1 up to about 3:1.

The aforementioned processes are specific to beta-ionone. As further exemplified infra, when the reaction conditions of this process are applied to alpha-ionone, as opposed to beta-ionone, epoxide formation occurs and neither a substantial amount of enol acetate nor isomers of beta-cyclohomocitral are formed.

The mixtures of damascenone and 2,2,6-trimethyl-1-cyclohexen-1-ylacetaldehyde (or beta-cyclohomocitral) of our invention are capable of supplying and/or potentiating certain flavor and aroma notes usually lacking in many fruit flavors, wine flavors, and "fermented" type flavors as well as tobacco flavors heretofore provided. Furthermore, the mixtures of damascenone and beta-cyclohomocitral of our invention are capable of supplying certain fragrance notes usually lacking in many perfumery materials, for example, rose fragrances.

Contemplated within the scope of our invention are weight ratios of damascenone:beta-cyclohomocitral of from 1:99 up to 99:1. It is, however, preferable in the practice of our invention to use weight ratios of damascenone:beta-cyclohomocitral of from about 1:20 up to about 1:1. From an economical as well as an organoleptic standpoint, the most preferable weight ratio of damascenone:beta-cyclohomocitral is from about 1:20 up to about 1:10.

When the mixtures of damascenone and beta-cyclohomocitral of our invention are used as food flavor adjuvants, the nature of the co-ingredients included with the said mixtures of damascenone and beta-cyclohomocitral in formulating the product composition will also serve to alter the organoleptic characteristics of the ultimate foodstuff treated therewith.

As used herein in regard to flavors, the terms "alter" and "modify" in their various forms means "supplying or imparting flavor character or note to otherwise bland, relatively tasteless substances or augmenting the existing flavor characteristic where a natural flavor or synthetic flavor or mixture of natural and synthetic flavors is deficient in some regard, or supplementing the existing flavor impression to modify its quality, character or taste."

As used herein, the term "enhance" is intended to mean the intensification (without effecting a change in king of quality of aroma or taste) of one or more taste and/or aroma nuances present in the organoleptic impression of a consumable material, e.g. foodstuff, tobacco, chewing gum, medicinal product, perfume composition or perfumed article.

As used herein the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks and the like.

As used herein the term "chewing gum" is intended to mean a composition which comprises a substantially water-insoluble, chewable plastic gum base such as chicle, or substitutes therefor, including jelutung, guttakay rubber and/or certain comestible natural or synthetic resins or waxes. Incorporated within the gum base, in admixture therewith may be plasticizers or softening agents, e.g. glycerine; and a flavoring composition which incorporates a mixture of damascenone and β-cyclohomocitral of our invention, and, in addition, sweetening agents which may be sugars, including sucrose or dextrose and/or artificial sweeteners including dipeptides, cyclamates and saccharin. Other optional ingredients may also be present.

The term "medicinal product" includes both solids and liquids which are ingestible, non-toxic materials having medicinal value such as cough syrups, cough drops, toothpaste, aspirin and chewable medicinal tablets as further exemplified herein.

Substances suitable for use herein as co-ingredients or flavoring adjuvants are well known in the art for such use being extensively described in the relevant literature. Such material is required to be "ingestibly" acceptable and thus non-toxic or otherwise non-deleterious. Particularly critical is the additional requirement that such material be organoleptically compatible with mixtures of damascenone and beta-cyclohomocitral encompassed within the scope of our invention. Also critical is the additional requirement that such material be nonreactive (within the range of storage conditions and room temperature use conditions) with each of damascenone and beta-cyclohomocitral.

Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxyanisole (mixture of 2- and 3-tertiary-butyl-4-hydroxyanisole), butylated hydroxy toluene, (2,6-di-tertiary-butyl-4-methyl phenol), propyl gallate and the like and sequestrants, e.g., citric acid.

Thickener compounds include carriers, binders, protective colloids, suspending agents, emulsifiers and the like, e.g., agaragar, carrageenan; cellulose and cellulose derivatives such as carboxymethyl cellulose and methyl cellulose; natural and synthetic gums such as gum arabic, gum tragacanth; gelatin, proteinaceous materials; lipids, carbohydrates, starches pectins, and emulsifiers, e.g., mono- and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate; enzymes, yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-3-pentenoic acid; ketones and aldehydes, e.g., acetaldehyde, acetophenone, acetone, acetyl methyl carbinol, acrolein, n-butanal, crotonal, diacetyl, beta, beta-dimethyl-acrolein, n-hexanal, 2-hexenal, cis-3-hexenal, 2-heptanal, 4-(p-hydroxyphenyl)-2-butanone, alpha-ionone, beta-ionone, methyl-3-butanone, 2-pentanone, 2-pentenal and propanal; alcohols such as 1-butanal, benzyl alcohol, 1-borneol, trans-2-buten-1-ol, ethanol, geraniol, 1-hexanal, 2-heptanol, trans-2-hexenol-1, cis-3-hexen-1-ol, 3-methyl-3-buten-1-ol, 1-pentenol, 1-penten-3-ol, p-hydroxyphenyl-2-ethanol, isoamyl alcohol, isofenchyl alcohol, phenyl-2-ethanol, alpha-terpineol, cis-terpineol hydrate; esters, such as butyl acetate, ethyl acetate, ethyl acetoacetate, ethyl benzoate, ethyl butyrate, ethyl caproate, ethyl cinnamate, ethyl crotonate, ethyl formate, ethyl isobutyrate, ethyl isovalerate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpah-methylbutyrate, propyl acetate, amyl acetate, amyl butyrate, benzyl salicylate, dimethyl anthranilate, ethyl methylphenylglycidate, ethyl succinate, isobutyl cinnamate and terpenyl acetate; essential oils, such as jasmine absolute, rose absolute, orris absolute, lemon essential oil, Bulgarian rose, yara yara, natural raspberry oil and vanilla; lactones; sulfides, e.g., methyl sulfide and other materials such as maltol, acetoin and acetals (e.g., 1,1-diethoxyethane, 1,1-dimethoxyethane and dimethoxymethane.

The specific flavoring adjuvant selected for use may be either solid or liquid depending upon the desired physical form of the ultimate product, i.e., foodstuff, whether simulated or natural, and should, in any event, be capable of providing an environment in which the mixture of damascenone and beta-cyclohomocitral can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of mixture of damascenone and beta-cyclohomocitral employed in a particular instance can vary over a relatively wide range whereby to its desired organoleptic effects having reference to the nature of the product are achieved. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected to be effective, i.e., sufficient to alter, modify or enhance the organoleptic characteristics of the parent composition, whether foodstuff per se or flavoring composition.

The use of insufficient quantities of mixture of damascenone and beta-cyclohomocitral will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of mixture of damascenone and beta-cyclohomocitral ranging from a small but effective amount, e.g., 0.2 parts per million up to about 50 parts per million by weight based on total composition are suitable. Concentrations in excess of the maximum quantity stated are not normally recommended, since they fail to prove commensurate enhancement of organoleptic properties. In those instances, wherein the mixture of damascenone and beta-cyclohomocitral is added to the foodstuff as an integral component of a flavoring composition, it is, of course, essential that the total quantity of flavoring composition employed be sufficient to yield an effective concentration (of mixture of damascenone and beta-cyclohomocitral) in the foodstuff product.

Food flavoring compositions prepared in accordance with the present invention preferably contain the mixture of damascenone and beta-cyclohomocitral in concentrations ranging from about 0.1% up to about 15% by weight based on the total weight of the said flavoring composition.

The compositions described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the mixture of damascenone and beta-cyclohomocitral with, for example, gum arabic, gum tragacanth, carrageenan and the like, and thereafter spray-drying the resultant mixture whereby to obtain the particular solid product. Pre-prepared flavor mixes in powder form, e.g., a fruit-flavored powder mix are obtained by mixing the dried solid components, e.g., starch, sugar and the like and mixture of damascenone and beta-cyclohomocitral in a dry blender until the requisite degree of uniformity is achieved.

It is presently preferred to combine with the mixture of damascenone and beta-cyclohomocitral, the following adjuvants:

p-Hydroxybenzyl acetone;
Geraniol;
Acetaldehyde;
Maltol;
Ethyl methyl phenyl glycidate;
Benzyl acetate;
Dimethyl sulfide;
Vanillin;
Methyl cinnamate;
Ethyl pelargonate;
Methyl anthranilate;
Isoamyl acetate;
Isobutyl acetate;
Alpha ionone;
Ethyl butyrate;
Acetic acid;
Gamma-undecalactone;
Naphthyl ethyl ether;
Diacetyl;
Ethyl acetate;
Anethole;
Isoamyl butyrate;
Cis-3-hexenol-1;
2-Methyl-2-pentenoic acid;
Elemecine (4-allyl-1,2,6-trimethoxy benzene);
Isoelemecine (4-propenyl-1,2,6-trimethoxy benzene); and
2-(4-hydroxy-4-methylpentyl) norbornadiene prepared according to U.S. application Ser. No.

461,703 filed on Apr. 17, 1974

An additional aspect of our invention provides an organoleptically improved smoking tobacco product and additives therefor, as well as methods of making the same which overcome specific problems heretofore encountered in which specific desired woody flavor characteristics of natural tobacco are created or enhanced and may be readily controlled and maintained at the desired uniform level regardless of variations in the tobacco components of the blend.

This invention further provides improved tobacco additives and methods whereby various desirable woody flavoring characteristics with sweet, floral, fruity, earthy and green notes may be imparted to smoking tobacco products and may be readily varied and controlled to produce the desired uniform flavoring characteristics.

In carrying out this aspect of our invention, we add to smoking tobacco materials or a suitable substitute therefor (e.g., dried lettuce leaves) an aroma and flavor additive containing as an active ingredient a mixture of damascenone and beta-cyclohomocitral.

In addition to the mixture of damascenone and beta-cyclohomocitral of our invention, other flavoring and aroma additives may be added to the smoking tobacco material or substitute therefor either separately or in mixture with the beta-cyclohomocitral damascenone mixture as follows:

I. Synthetic Materials:
  Beta-ethyl-cinnamaldehyde;
  Eugenol;
  Dipentene;
  Damascenone;
  Maltol;
  Ethyl maltol;
  Delta undecalactone;
  Delta decalactone;
  Benzaldehyde;
  Amyl acetate;
  Ethyl butyrate;
  Ethyl valerate;
  Ethyl acetate;
  2-Hexenol-1,2-methyl-5-isopropyl-1,3-nonadiene-8-one;
  2,6-Dimethyl-2,6-undecadiene-10-one;
  2-Methyl-5-isopropyl acetophenone;
  2-Hydroxy-2,5,5,8a-tetramethyl-1-(2-hydroxyethyl)-decahydronaphthalene;
  Dodecahydro-3a-6,6,9a-tetramethyl naphtho-(2,1-b)-furan;
  4-Hydroxy hexanoic acid, gamma lactone;
  Polyisoprenoid hydrocarbons defined in Example V of U.S. Pat. 3,589,372 issued on June 29, 1971.

II. Natural Oils
  Celery seed oil;
  Coffee extract;
  Bergamot Oil;
  Cocoa extract;
  Nutmeg oil;
  Origanum oil An aroma and flavoring concentrate containing a mixture of damascenone and beta-cyclohomocitral and, if desired, one or more of the above indicated additional flavoring addtives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of natural and/or sweet notes, we have found that satisfactory results are obtained if the proportion by weight of the sum total of mixture of damascenone and beta-cyclohomocitral to smoking tobacco material is between 125 ppm and 1,500 ppm (1.0125%–0.15%) of the active ingredients to the smoking tobacco material. We have further found that satisfactory results are obtained if the proportion by weight of the sum total of mixture of damascenone and beta-cyclohomocitral used to flavoring material is between 1,000 and 10,000 ppm (0.10%–1.5%)

Any convenient method for incorporating the mixture of damascenone and beta-cyclohomocitral in the tobacco product may be employed. Thus, the mixture of damascenone and beta-cyclohomocitral taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of the mixture of damascenone and beta-cyclohomocitral taken alone or taken further together with other flavoring additives as set forth above, may be applied by means of a suitable applicator such as a brush or roller on the paper or leaf wrapper for the smoking product, or it may be applied to the filter by either spraying, or dipping, or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the mixture of damascenone and beta-cyclohomocitral in excess of the amounts or concentrations above indicated so that when blended with other tobaccos, the final product will have the percentage within the indicated range.

In accordance with one specific example of our invention, an aged, cured and shredded domestic burley tobacco is spread with a 10% ethyl alcohol solution of 1:1 mixture of damascenone and beta-cyclohomocitral in an amount to provide a tobacco composition containing 400 ppm by weight of beta-cyclohomocitral-damascenone mixture on a dry basis. Thereafter, the alcohol is removed by evaporation and the tobacco is manufactured into cigarettes by the usual techniques. The cigarette when treated as indicated has a desired and pleasing aroma which is detectable in the main and side streams when the cigarette is smoked. This aroma is described as being sweeter, rich, less harsh, more tobacco-like and having excellent woody, "cigar box" like notes.

While our invention is particularly useful in the manufacture of smoking tobacco, such as cigarette tobacco, cigar tobacco and pipe tobacco, other tobacco products formed from sheeted tobacco dust or fines may also be used. Likewise, the mixture of damascenone and beta-cyclohomocitral of our invention can be incorporated with materials such as filter tip materials, seam paste, packaging materials, and the like which are used along with tobacco to form a product adapted for smoking. Furthermore, the beta-cyclohomocitral-damascenone mixture can be added to certain tobacco substitutes of natural or synthetic origin (e.g., dried lettuce leaves) and, accordingly, by the term "tobacco" as used throughout this specification is meant any composition intended for human consumption by smoking or otherwise, whether composed of tobacco plant parts or substitute materials or both.

The mixture of damascenone and beta-cyclohomocitral and one or more auxiliary perfume ingredients, including, for example, alcohols, aldehydes, nitriles, esters, cyclic esters, and natural essential oils, may be admixed so that the combined odors of the individual components produce a pleasant and desired fragrance, particularly and preferably in rose and other "floral" fragrances. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual components which contribute its particular olfactory characteristics, but the over-all effect of the perfume composition will be the sum of the effects of each of the ingredients. Thus, the mixture of damascenone and beta-cyclohomocitral can be used to alter the aroma characteristics of a perfume composition, for example, by utilizing or moderating the olfactory reaction contributed by another ingredient in the composition.

The amount of mixture of damascenone and beta-cyclohomocitral of our invention which will be effective in perfume compositions depends on many factors, including the other ingredients, their amounts and the effects which are desired. It has been found that perfume compositions containing as little as 0.01% of mixture of damascenone and beta-cyclohomocitral and even less (e.g., 0.005%) can be used to impart a rosey aroma with earthy and green notes to soaps, cosmetics or other products. The amount employed can range up to 10% of the fragrance components and will depend on considerations of cost, nature of the end product, the effect desired on the finished product and the particular fragrance sought.

The mixture of damascenone and beta-cyclohomocitral is useful, taken alone or in perfume compositions as an olfactory component in detergents and soaps, space odorants, and deodorants, perfumes, colognes, toilet water, bath preparations, such as bath oils, and bath solids; hair preparations, such as lacquers, brilliantines, pomades and shampoos; cosmetic preparations, such as creams, deodorants, hand lotions and sun screens; powders, such as talcs, dusting powders, face powders and the like. When used as an olfactory component as little as 1% of the damascenone-beta-cyclohomocitral mixture of our invention will suffice to impart an intense rosey fragrance to muguet formulations. Generally, no more than 3% of the damascenone-beta-cyclohomocitral mixture based on the ultimate end product is required in the perfume composition.

In addition, the perfume composition or fragrance composition of our invention can contain a vehicle, or carrier for the damascenone-beta-cyclohomocitral mixture. The vehicle can be a liquid such as an alcohol, a non-toxic alcohol, a non-toxic glycol, or the like. The carrier can also be an absorbent solid, such as a gum (e.g., gum arabic) or components for encapsulating the composition (such as gelatin).

It will thus be apparent that the damascenone-beta-cyclohomocitral mixture of our invention can be utilized to alter the sensory properties, particularly organoleptic properties, such as flavor and/or fragrance of a wide variety of consumable materials.

Examples I-XVII illustrate the utility of the damascenone-beta-cyclohomocitral mixtures of our invention. It will be understood that these Examples are illustrative and the invention is to be considered restricted thereto only as indicated in the appended claims. All parts and percentages given herein are by weight unless otherwise specified.

EXAMPLE I

RASPBERRY FLAVOR FORMULATION

The following formulation is prepared:

| Ingredients | Parts |
| --- | --- |
| Vanillin | 2 |
| Maltol | 4 |
| Para-Hydroxybenzylacetone | 5 |
| Alpha-Ionone (10% in propylene glycol) | 2 |
| Ethyl butyrate | 6 |
| Ethyl acetate | 16 |
| Dimethyl sulfide | 1 |
| Isobutyl acetate | 14 |
| Acetic acid | 10 |
| Acetaldehyde | 10 |
| Propylene glycol | 930 |
| | 1000 |

To each of three portions of the foregoing formulation one of the following compositions of matter is added:
a. damascenone at 0.01 ppm;
b. beta-cyclohomocitral at 0.1 ppm;
c. mixture of damascenone at 0.01 ppm and beta-cyclohomocitral at 0.1 ppm.

The mixture of damascenone and beta-cyclohomocitral as such is sweeter, fruitier, fruity/rosey and more pleasant in taste and aroma than the beta-cyclohomocitral or the damascenone taken alone when examined in ethanol solutions at a concentration of 10%.

At the indicated levels in the above-mentioned raspberry formulation the three compositions of matter are compared at 100 ppm in water by members of a bench panel. A majority of the members of the bench panel preferred the flavor formulation containing the mixture of damascenone and beta-cyclohomocitral as being the most natural raspberry flavor since it is the only composition of matter that has the characteristic seedy note of ripe raspberries.

Addition of the mixture of damascenone and beta-cyclohomocitral to the flavor formulation gives rise to an unexpected effect since only 50% of each of the ingredients of the mixture is required to yield the same strength taste and aroma notes as could be expected by merely testing organoleptically the original compounds by themselves.

Similar results are achieved using the following weight ratios of damascenone to beta-cyclohomocitral:

| ppm damascenone | ppm-beta-cyclohomocitral | weight ratio |
| --- | --- | --- |
| 0.05 | 1.0 | 1:20 |
| 0.15 | 1.0 | 1:6.7 |
| 0.20 | 1.0 | 1:5 |
| 0.25 | 1.0 | 1:4 |
| 0.4 | 1.0 | 1:2.5 |

-continued

| ppm damascenone | ppm-beta-cyclohomocitral | weight ratio |
|---|---|---|
| 0.6 | 1.0 | 1:1.7 |
| 1.0 | 1.0 | 1:1 |

EXAMPLE II
ROSE FORMULATION

The following mixture is prepared:

| Ingredients | Parts by Weight |
|---|---|
| Rhodinol | 270.0 |
| Nerol | 90.0 |
| Linalool | 30.0 |
| Terpineol | 30.0 |
| Phenyl Ethyl Alcohol | 12.0 |
| Terpinenol | 5.0 |
| Linalyl Acetate | 1.5 |
| Citronellyl Acetate | 15.0 |
| Geranyl Acetate | 10.0 |
| Eugenol | 33.0 |
| Citral | 15.0 |
| Phenyl Ethyl Acetate | 20.0 |
| Rose Oxide | 8.0 |
| Guaiacol | 30.0 |
| l-citronellal | 90.0 |
| Neryl Acetate | 3.0 |
| Clove Bud Oil | 1.0 |
| Cadinene | 2.0 |
| Guaiene | 1.0 |
| Gum Turpentine | 12.0 |
| Alpha-pinene | 1.0 |
| Myrcene | 5.0 |
| Limonene | 2.0 |
| p-cimene | 1.0 |
|  | 687.5 |

To the foregoing formulation 30 parts by weight of a 0.1% solution of beta-cyclohomocitral in diethyl phthalate and 15 parts by weight of a 0.01% solution of damascenone in diethyl phthalate is added. The resultant mixture has a much brighter rose top note and is fruitier and richer on dry out as compared with the same mixture without the composition of matter containing the beta-cyclohomocitral and the damascenone.

EXAMPLE III
PREPARATION OF A SOAP COMPOSITION

100 Grams of soap chips are mixed with one gram of the perfume composition of Example II until a substantially homogeneous composition is obtained. The perfumed soap composition manifests an excellent fruity, rose character with green, earthy notes.

EXAMPLE IV
PREPARATION OF A DETERGENT COMPOSITION

A total of 100 grams of detergent powder is mixed with 0.15 grams of the perfume composition of Example II, until a substantially homogeneous composition is obtained. This composition has an excellent fruity, rose aroma with earthy, green notes.

EXAMPLE V
PERFUMED LIQUID DETERGENT

Concentrated liquid detergent each with a fruity, rosey aroma are prepared containing 0.10%, 0.15% and 0.20% of a mixture of damascenone and beta-cyclohomocitral in a weight ratio of 1:0.1 of beta-cyclohomocitral:damascenone. They are prepared by adding and homogeneously mixing the appropriate quantity of a mixture of damascenone and beta-cyclohomocitral in the liquid detergent. The detergents all possess a fruity, rosey fragrance, the intensity increasing with greater concentrations of mixture of damascenone and beta-cyclohomocitral.

EXAMPLE VI
PREPARATION OF A COLOGNE AND HANDKERCHIEF PERFUME

The composition of Example II is incorporated in a cologne at a concentration of 2.5% in 85% aqueous ethanol; and into a handkerchief perfume at a concentration of 20% (in 95% aqueous ethanol). The use of the mixture of damascenone and beta-cyclohomocitral in the composition of Example II affords a distinct and definite strong fruity, rose aroma with earthy and green notes to the handkerchief perfume and cologne.

EXAMPLE VII
PREPARATION OF SOAP COMPOSITION

100 Grams of soap chips are mixed with 1 gram of a mixture of damascenone and beta-cyclohomocitral where the ratio of damascenone:beta-cyclohomocitral is 0.1:1, until a substantially homogeneous composition is obtained. The perfumed soap composition manifests an excellent rose aroma with woody, green and earthy notes and an excellent sweet top note.

EXAMPLE VIII
PREPARATION OF A DETERGENT COMPOSITION

A total of 100 g of a detergent powder is mixed with 0.15 g of a mixture of damascenone and beta-cyclohomocitral (the ratio of damascenone:beta-cyclohomocitral being 0.2:1) until a substantially homogeneous composition is obtained. This composition has an excellent rose aroma with woody, green and earthy notes.

EXAMPLE IX
PREPARATION OF A COLOGNE AND HANDKERCHIEF PERFUME

A mixture of 1 part beta-cyclohomocitral and 2 parts damascenone is incorporated into a cologne at a concentration of 2.5% in 85% aqueous ethanol; and into a handkerchief perfume at a concentration of 20% (in 95% aqueous ethanol). A distinct and definite rose fragrance with woody, green and earthy top notes is imparted to the cologne and to the handkerchief perfume.

EXAMPLE X
PREPARATION OF A COSMETIC-POWDER COMPOSITION

A cosmetic powder is prepared by mixing in a ball mill, 100 grams of talcum powder with 0.15 grams of a mixture consisting of 50% beta-cyclohomocitral and 50% damascenone. It has an excellent rose aroma with woody, green and earthy notes.

EXAMPLE XI

TOBACCO FORMULATION

A tobacco mixture is produced by admixing the following ingredients:

| Ingredient | Parts by Weight |
|---|---|
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

Cigarettes are prepared from this tobacco.
The following flavor formulation is prepared:

| Ingredient | Parts by Weight |
|---|---|
| Ethyl butyrate | .05 |
| Ethyl valerate | .05 |
| Maltol | 2.00 |
| Cocoa extract | 26.00 |
| Coffee extract | 10.00 |
| Ethyl alcohol | 20.00 |
| Water | 41.90 |

The above-stated tobacco flavor formulation is applied at the rate of 0.1% to all of the cigarettes produced using the above tobacco formulation. Half of the cigarettes are then treated with 250 or 500 ppm of a mixture containing 0.1 parts damascenone and one part beta-cyclohomocitral. The control cigarettes not containing this composition of matter containing damascenone and beta-cyclohomocitral and the experimental cigarettes which contain the damascenone and beta-cyclohomocitral are elevated by paired comparison and the results are set forth as follows:

The experimental cigarettes are found to have more body and thereby, on smoking, sweeter, richer, more tobacco-like and less harsh with intense woody and fruity notes.

The tobacco of the experimental cigarettes, prior to smoking, has sweet, rosey, floral, fruity, earthy and green notes. All cigarettes are elevated for smoke flavor with a 20 mm cellulose acetate filter.

The mixture of beta-cyclohomocitral and damascenone enhances the natural tobacco-like taste and aroma of a blended cigarette imparting to it the woody and fruity notes on smoking.

EXAMPLE XII 2 ppm of a 1:1 mixture of damascenone and beta-cyclohomocitral are added to burgundy red wine, ("Selected California" produced by the Christian Brothers of Napa, Calif.) and compared with an unflavored wine by a bench panel. The wine flavored with the mixture of damascenone and beta-cyclohomocitral is preferred as having more top notes and a richer aroma, giving the effect of "round" and "aged" wine.

EXAMPLE XIII

A mixture containing 3 parts by weight beta-cyclohomocitral and 1 part by weight of damascenone is added to distilled white vinegar at the rate of 0.01% and compared in water at the rate of 1% with the unflavored vinegar. The mixture of damascenone and beta-cyclohomocitral adds natural-like, wine vinegar-like top notes to the distilled white vinegar and rounds off the top notes thus improving the aroma and taste of this product.

EXAMPLE XIV

A. POWDER FLAVOR

20 Grams of the flavor composition of Example I which flavor composition contains a mixture of beta-cyclohomocitral and damascenone, is emulsified in a solution containing 300 gm gum acacia and 700 gm water. The emulsion is spray-dried with a Bowen Lab Model Drier utilizing 250 c.f.m. of air with an inlet temperature of 500°F., and outlet temperature of 200°F., and a wheel speed of 50,000 r.p.m.

B. PASTE BLEND

The following mixture is then prepared:

| Ingredient | Parts by Weight |
|---|---|
| Liquid Flavor Composition of Example I | 48.4 |
| Cab-O-Sil M-5 | 3.2 |
| (Brand of Silica produced by the Cabot Corporation of 125 High Street, Boston, Mass. 02110); Physical Properties: Surface Area: 200 m²/gm Nominal Particle Size: 0.012 microns Density: 2/3 lbs/cu.ft. | |

The Cab-O-Sil is dispersed in any of the exemplified liquid flavor compositions with vigorous stirring, thereby resulting in a viscous liquid. 48.4 Parts by weight of the powder flavor composition prepared in Part A is then blended into the said viscous liquid, with stirring at 25°C for a period of 30 minutes, resulting in a thixotropic sustained release flavor paste.

EXAMPLE XV

CHEWING GUM

100 Parts by weight of chicle are mixed with 4 parts by weight of the flavor prepared in accordance with Example XIV. 300 Parts of sucrose and 100 parts of corn syrup are added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing the chewing gum has a pleasant long lasting raspberry flavor.

EXAMPLE XVI

TOOTHPASTE FORMULATION

The following separate groups of ingredients are prepared:

| Group "A" | |
|---|---|
| 30.200 | Glycerin |
| 15.325 | Distilled Water |
| .100 | Sodium Benzoate |
| .125 | Saccharin Sodium |
| .400 | Stannous Fluoride |

-continued

| | |
|---|---|
| Group "B" | |
| 12.500 | Calcium Carbonate |
| 37.200 | Dicalcium Phosphate (Dihydrate) |
| Group "C" | |
| 2.000 | Sodium n-Lauroyl Sarcosinate (foaming agent) |
| Group "D" | |
| 1.200 | Flavor Material of Example XIV |
| 100.00 (Total) | |

PROCEDURE
1. The ingredients in Group "A" are stirred and heated in a steam jacketed kettle to 160°F.
2. Stirring is continued for an additional three to five minutes to form a homogeneous gel.
3. The powders of Group "B" are added to the gel, while mixing until a homogeneous paste is formed.
4. With stirring, the flavor of "D" is added and lastly the sodium n-lauroyl sarcosinate.
5. The resultant slurry is then blended for one hour. The completed paste is then transferred to a three roller mill and then homogenized, and finally tubed.

The resulting toothpaste when used in a normal toothbrushing procedure yields a pleasant raspberry flavor of constant strong intensity throughout said procedure (1–1.5 minutes).

EXAMPLE XVII

CHEWABLE VITAMIN TABLETS

The flavor material produced according to the process of Example XIV is added to a Chewable Vitamin Tablet Formulation at a rate of 5 gm/gm which Chewable Vitamin Tablet Formulation is prepared as follows:

| | Gms/1000 tablets |
|---|---|
| Vitamin C (ascorbic acid) as ascorbic acid-sodium ascorbate mixture 1:1 | 70.0 |
| Vitamin B₁ (thiamine mononitrate) as Rocoat⁴ thiamine mononitrate 33⁻% (Hoffman La Roche) | 4.0 |
| Vitamin B₂ (riboflavin) as Rocoat^R riboflavin 33⅓% | 5.0 |
| Vitamin B₆ (pyridoxine hydrochloride) as Rocoat^R pyridoxide hydrochloride 33⅓% | 4.0 |
| Niacinamide as Rocoat^R niacinamide 33⅓% | 33.0 |
| Calcium pantothenate | 11.5 |
| Vitamin B₁₂ (cyanocobalamin) as Merck 0.1% in gelatin | 3.5 |
| Vitamin E (dl-alpha tocopheryl acetate) as dry Vitamin E acetate 33⅓% Roche | 6.6 |
| d-Biotin | 0.044 |
| Certified lake color | 5.0 |
| Flavor of Example XIV | 5.0 |
| Sweetener - sodium saccharin | 1.0 |
| Magnesium stearate lubricant | 10.0 |
| Mannitol q.s. to make | 500.0 |

Preliminary tablets are prepared by slugging with flat-faced punches and grinding the slugs to 14 mesh. 13.5 g dry Vitamin A Acetate and 0.6 g Vitamin D are then added as beadlets. The entire blend is then compressed using concave punches at 0.5 g each.

Chewing of the resultant tablet yields a pleasant, long-lasting, consistently strong raspberry flavor for a period of 12 minutes.

What is claimed is:

1. A composition of matter consisting essentially of 2,6,6-trimethyl-1-cyclohexen-1-ylacetaldehyde having the structure:

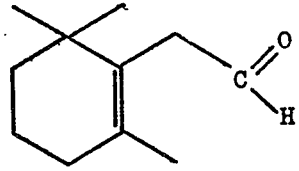

and 2,6,6-trimethyl-1crotonyl-1,3-cyclohexadiene having the structure:

the weight ratio of 2,6,6-trimethyl-1-cyclohexen-1-ylacetaldehyde to 2,6,6-trimethyl-1-crotonyl-1,3-cyclohexadiene being in the range of from 1:20 up to 1:1.

2. The composition of matter of claim 1 wherein the weight ratio of 2,6,6-trimethyl-1-cyclohexen-1-ylacetaldehyde to 2,6,6-trimethyl-1-crotonyl-1,3-cyclohexadiene is in the range of from 1:20 up to 1:10.

3. A process for altering, modifying or enhancing the aroma or taste of a foodstuff which comprises adding thereto from 0.2 ppm up to about 50 ppm based on the total weight of said foodstuff, of the composition of claim 2.

4. A process for altering, modifying or enhancing the aroma or taste of a foodstuff which comprises adding thereto from 0.2 ppm up to about 50 ppm based on the total weight of said foodstuff, of the composition of claim 2.

5. A flavor modifying, altering or enhancing composition comprising (i) from about 0.1% up to about 15% by weight of said flavor modifying composition of the composition of claim 1 and (ii) as a flavor adjuvant, at least one compound selected from the group consisting of p-hydroxybenzyl acetone, maltol, benzyl acetate, methyl cinnamate, geraniol, ethyl methyl phenyl glycidate, vanillin, methyl anthranilate, alpha-ionone, gamma undecalactone, ethyl pelargonate, isoamyl acetate, acetaldehyde, dimethyl sulfide, isobutyl acetate, acetic acid, ethyl butyrate, diacetyl, anethole, cis-3-hexenol-1, naphthyl ethyl ether, ethyl acetate, isoamyl butyrate, 2-methyl-2-pentenoic acid, 2(4-hydroxy-4-methylphenyl norbornadiene, 4-allyl-1,2,6-trimethoxy benzene and 4-propenyl-1,2,6-trimethoxy benzene.

6. A flavor modifying, altering or enhancing composition comprising (i) from about 0.1% up to about 15% by weight of said flavor modifying composition of the composition of claim 2 and (ii) as a flavor adjuvant, at least one compound selected from the group consisting of p-hydroxybenzyl acetone, maltol, benzyl acetate, methyl cinnamate, geraniol, ethyl methyl phenyl glycidate, vanillin, methyl anthranilate, alpha-ionone, gamma undecalactone, ethyl pelargonate, isoamyl acetate, acetaldehyde, dimethyl sulfide, isobutyl acetate, acetic acid, ethyl butyrate, diacetyl, anethole, cis-3-hexenol-1, naphthyl ethyl ether, ethyl acetate, isoamyl butyrate, 2-methyl-2-pentenoic acid, 2(4-hydroxy-4-methylphenyl norbornadiene, 4-allyl-1,2,6-trimethoxy benzene and 4-propenyl-1,2,6-trimethoxy benzene.

* * * * *

UNITED STATES PATENT AND TRADEMARK OFFICE
CERTIFICATE OF CORRECTION

PATENT NO. : 3,959,508
DATED : May 25, 1976
INVENTOR(S) : Alan Owen Pittet; Erich Manfred Klaiber; Manfred Hugo Vock; Edward J. Shuster; Joaquin Vinals It is certified that error appears in the above-identified patent and that said Letters Patent are hereby corrected as shown below:

Col. 17, line 37, in the middle of the line, "elevated" should read --- evaluated ---

Col. 17, line 45, in the middle of the line, "elevated" should read --- evaluated ---

Signed and Sealed this

Twenty-eighth Day of September 1976

[SEAL]

Attest:

RUTH C. MASON
Attesting Officer

C. MARSHALL DANN
Commissioner of Patents and Trademarks